(12) United States Patent
Suzuki et al.

(10) Patent No.: US 8,074,504 B2
(45) Date of Patent: Dec. 13, 2011

(54) MALFUNCTION DIAGNOSING APPARATUS FOR INTERNAL COMBUSTION ENGINES

(75) Inventors: Yusaku Suzuki, Toyota (JP); Seiichiro Nishikawa, Okazaki (JP)

(73) Assignee: Denso Corporation, Kariya (JP)

( * ) Notice: Subject to any disclaimer, the term of this patent is extended or adjusted under 35 U.S.C. 154(b) by 159 days.

(21) Appl. No.: 12/706,921

(22) Filed: Feb. 17, 2010

(65) Prior Publication Data

US 2010/0206059 A1 Aug. 19, 2010

(30) Foreign Application Priority Data

Feb. 17, 2009 (JP) ................................ 2009-033482

(51) Int. Cl.
*G01M 15/04* (2006.01)
(52) U.S. Cl. .................................................. 73/114.38
(58) Field of Classification Search ................ 73/114.38
See application file for complete search history.

(56) References Cited

U.S. PATENT DOCUMENTS

| | | | |
|---|---|---|---|
| 4,957,087 A | 9/1990 | Ota | |
| 4,989,570 A * | 2/1991 | Kuribara et al. | 123/494 |
| 5,007,398 A * | 4/1991 | Kashiwabara | 123/479 |
| 5,881,703 A * | 3/1999 | Nankee et al. | 123/686 |
| 6,041,278 A * | 3/2000 | Kennie et al. | 701/103 |
| 6,389,874 B1 * | 5/2002 | Huff et al. | 73/1.02 |
| 6,714,856 B2 * | 3/2004 | Huff et al. | 701/114 |
| 7,519,467 B2 | 4/2009 | Katoh | |
| 7,574,905 B2 * | 8/2009 | Toya | 73/114.73 |
| 7,673,621 B2 * | 3/2010 | Carr et al. | 123/575 |
| 7,832,260 B2 * | 11/2010 | Tanaka | 73/114.38 |
| 7,908,073 B2 * | 3/2011 | Takubo | 701/103 |

FOREIGN PATENT DOCUMENTS

| | | |
|---|---|---|
| JP | 2-102346 | 4/1990 |
| JP | 3-085347 | 4/1991 |
| JP | 6-017693 | 1/1994 |
| JP | 2001-234805 | 8/2001 |
| JP | 2008-038785 | 2/2008 |

\* cited by examiner

*Primary Examiner* — Freddie Kirkland, III
(74) *Attorney, Agent, or Firm* — Nixon & Vanderhye PC (57) ABSTRACT

The present invention provides a malfunction diagnosing apparatus for an engine which enables selection of a fuel to be supplied to a tank from fuels having different properties. The apparatus includes a determining unit determining whether fuel has been supplied to the tank, a sensor detecting a property of the fuel supplied from the tank to an injection valve, an air-fuel ratio control unit determining an air-fuel ratio correction amount according to a difference between a target air-fuel ratio and an actual air-fuel ratio and according to the property of the fuel sensed by the sensor to correct a fuel injection quantity using the air-fuel ratio correction amount, and a diagnosing unit that definitively diagnoses malfunctions of the determining unit, the sensor, and a fuel system, based on a combination of a determination by the determining unit, detection by the sensor, and the air-fuel ratio correction amount or the difference.

6 Claims, 4 Drawing Sheets

MALFUNCTION DIAGNOSTIC CRITERIA TABLE

| RESULTS OF DIAGNOSIS | REFUEL DETERMINING MEANS | FUEL PROPERTY SENSOR | AIR-FUEL RATIO CORRECTION AMOUNT (FAF-FAFs) |
|---|---|---|---|
| (1) IN NORMAL FUNCTION (NOT IN MALFUNCTION) | — | — | — |
| (2) IN NORMAL FUNCTION (NOT IN MALFUNCTION) | ○ | — | ○ |
| (3) IN NORMAL FUNCTION (NOT IN MALFUNCTION) | ○ | ○ | — |
| (4) REFUEL DETERMINING MEANS BEING IN MALFUNCTION | — | ○ | ○ |
| (5) FUEL PROPERTY SENSOR BEING IN MALFUNCTION | ○ | — | ○ |
| (6) FUEL PROPERTY SENSOR BEING IN MALFUNCTION | — | ○ | — |
| (7) FUEL SYSTEM BEING IN MALFUNCTION | ○ | ○ | — |
| (8) FUEL SYSTEM BEING IN MALFUNCTION | — | — | ○ |

○ : NOT CHANGED (WITHIN PREDETERMINED RANGE)
— : CHANGED (OUT OF PREDETERMINED RANGE)

FIG.3

MALFUNCTION DIAGNOSING APPARATUS FOR INTERNAL COMBUSTION ENGINES

CROSS-REFERENCE TO RELATED APPLICATION

This application is based on and claims the benefit of priority from earlier Japanese Patent Application No. 2009-033482 filed Feb. 17, 2009, the description of which is incorporated herein by reference.

BACKGROUND OF THE INVENTION

1. Technical Field of the Invention

The present invention relates to a malfunction diagnosing apparatus for an internal combustion engine which enables selection of a fuel to be supplied to a fuel tank from a plurality of fuels having different properties.

2. Related Art

Recently, there is a trend of socially seeking decrease in the amount of emission of $CO_2$ or seeking utilization of fuels that can replace oil. In response to this, there has been an increasing demand for vehicles installing an engine (internal combustion engine) that can use any of gasoline, alcohol and a mixture of the both as a fuel. In such a vehicle, a fuel having an alcohol concentration different from that of the previously supplied fuel may often be supplied to the fuel tank. With the supply of such a fuel of different alcohol concentration, the alcohol concentration of the fuel in the fuel tank will change. Since the theoretical air-fuel ratio is different between gasoline and alcohol, the change in the alcohol concentration of the fuel will accompany the change in the theoretical air-fuel ratio of the fuel. Therefore, it is required that the fuel injection quantity (actual air-fuel ratio) be changed according to the alcohol concentration of the fuel.

A countermeasure against this issue is suggested in JP-A-H03-085347. In the apparatus disclosed in JP-A-H03-085347, an alcohol concentration sensor is provided in the fuel path extending from the fuel tank to the fuel injection valves to sense alcohol concentration of the fuel. According to the alcohol concentration sensed by the alcohol concentration sensor, a correction amount for the current alcohol concentration (hereinafter referred to as "alcohol concentration correction amount") is determined for the fuel injection quantity. At the same time, under air-fuel ratio feedback control, a correction amount for air fuel ratio feedback (hereinafter referred to as "air-fuel ratio feedback correction amount") is determined based on the difference between the target air-fuel ratio and the actual air-fuel ratio. Thus, the apparatus is configured to correct the fuel injection quantity using the alcohol concentration correction amount and the air-fuel ratio feedback correction amount.

Further, recent engine control systems using advanced electronic control are disclosed in, for example, JP-A-2008-038785 and JP-B-H07-006430. Such an engine control system includes a self-diagnostic function that performs various malfunction diagnoses such as for a fuel system and for an alcohol concentration sensor.

If malfunction occurs in a fuel system, the fuel necessary for the required injection quantity may no longer be injected. For this reason, the difference between the target air-fuel ratio and the actual air-fuel ratio becomes excessively large, and thus the air-fuel ratio feedback correction amount will result in an abnormal value exceeding a predetermined range. Also, if malfunction occurs in an alcohol concentration sensor, the alcohol concentration of the fuel may be erroneously sensed. Accordingly, the alcohol concentration correction amount for the fuel injection quantity will result in an abnormal value. For this reason, the difference between the target air-fuel ratio and the actual air-fuel ratio becomes excessively large, and thus the air-fuel ratio feedback correction amount will result in an abnormal value.

As will be understood from the relationship mentioned above, malfunction diagnosis of a fuel system and malfunction diagnosis of an alcohol concentration sensor are both ensured to be conducted using the air-fuel ratio feedback correction amount. However, in the case where malfunction diagnosis of a fuel system and malfunction diagnosis of an alcohol concentration sensor are conducted in combination, no definitive determination can be made at all whether the abnormal value of the air-fuel ratio feedback correction amount indicates malfunction in the fuel system or malfunction in the alcohol concentration sensor.

SUMMARY OF THE INVENTION

The present invention has been made in light of the problem described above and has as its object to provide a malfunction diagnosing apparatus for an internal combustion engine, which apparatus is able to diagnose malfunction, making a distinction between the malfunction in a fuel system and the malfunction in a fuel property sensor (alcohol concentration sensor).

In order to achieve the object, the present invention provides, as one aspect, a malfunction diagnosing apparatus for an internal combustion engine which enables selection of a fuel to be supplied to a fuel tank from a plurality of fuels having different properties, including: a refueling determining unit that determines whether fuel has been supplied to the fuel tank; a fuel property sensor that detects a property of the fuel supplied from the fuel tank to a fuel injection valve; an air-fuel ratio control unit that determines an air-fuel ratio correction amount according to a difference between a target air-fuel ratio and an actual air-fuel ratio and according to the property of the fuel sensed by the fuel property sensor to correct a fuel injection quantity of the fuel injection valve using the air-fuel ratio correction amount; and a malfunction diagnosing unit that definitively diagnoses malfunction of the refueling determining unit, malfunction of the fuel property sensor, and malfunction of a fuel system extending from the fuel tank to the fuel injection valve, based on a combination of a result of a determination made by the refueling determining unit, a result of detection conducted by the fuel property sensor, and the air-fuel ratio correction amount or the difference.

DETAILED DESCRIPTION OF THE PREFERRED EMBODIMENTS

With reference to the accompanying drawings, hereinafter will be described an embodiment of the present invention. In the present embodiment, a mode of a malfunction diagnostic apparatus of the present invention is applied to an intake-port injection engine. However, it should be appreciated that the application of the present invention is not limited to intake-port injection engines. The present invention may also be applied, as a matter of course, to cylinder injection engines or dual injection engines combining intake-port injection and cylinder injection.

Figure 1:
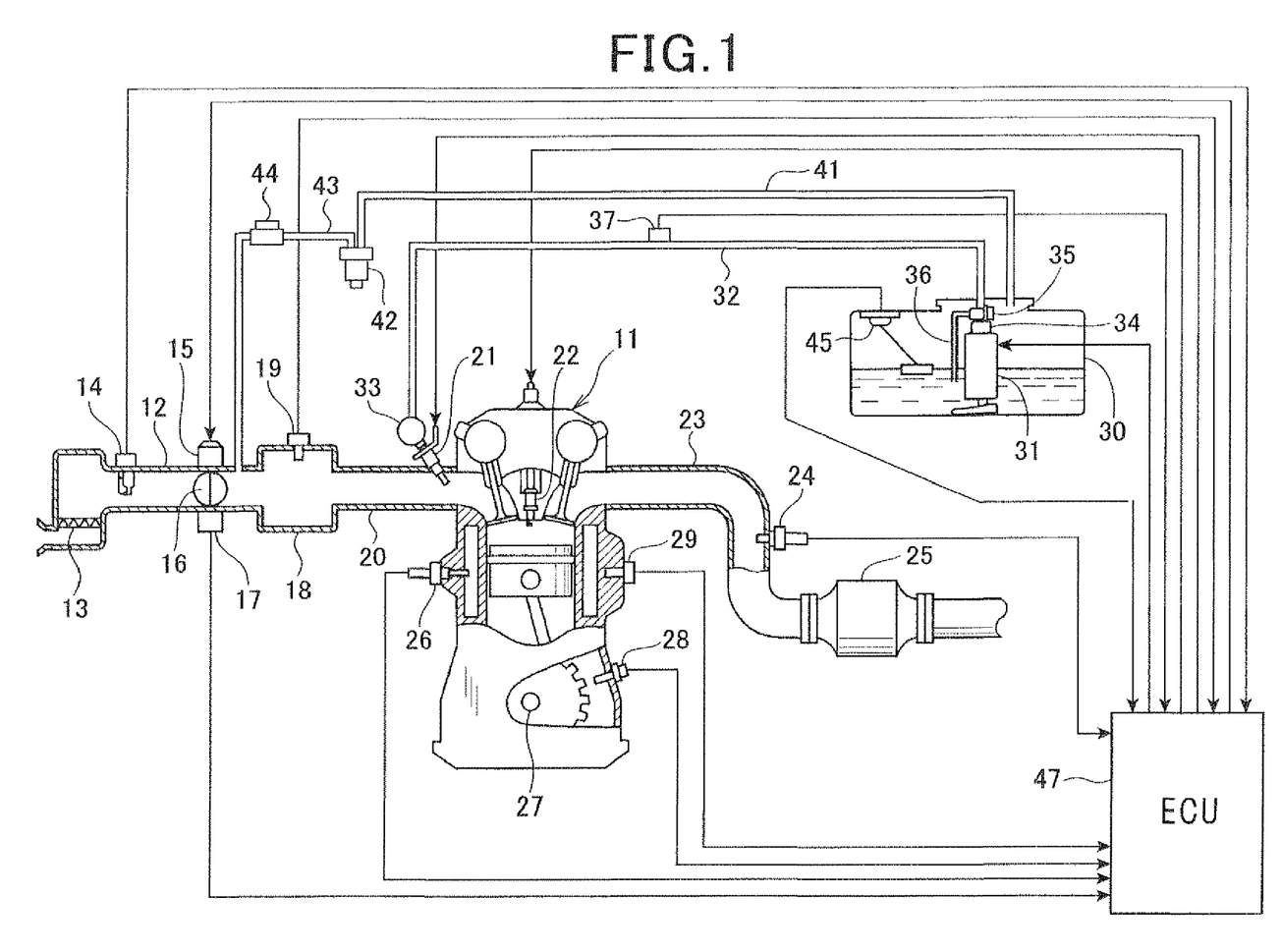
FIG. 1 is a schematic diagram of an engine control system according to an embodiment of the present invention.

Referring to FIG. 1, first, an engine control system in general is explained.

An engine 11, i.e. an internal combustion engine, is provided with an intake pipe 12. The intake pipe 12 is provided with an air cleaner 13 disposed most upstream of the intake pipe 12, and an air flow meter 14 disposed downstream of the air cleaner 13 to detect the amount of intake air. A throttle valve 16 and a throttle position sensor 17 are disposed downstream of the air flow meter 14. The position (throttle position) of the throttle valve 16 is adjusted by a motor 15. The throttle position sensor 17 senses the throttle position of the throttle valve 16.

A surge tank 18 is disposed downstream of the throttle valve 16. An intake pipe pressure sensor 19 is disposed at the surge tank 18 to sense the pressure in the intake pipe. Furthermore, the surge tank 18 is provided with an intake manifold 20 to introduce air to the individual cylinders in the engine 11, and fuel injection valves 21. The fuel injection valves 21 are attached to the manifold 20 so as to be closed to the intake ports of the respective cylinders to inject fuel toward the intake ports. The engine 11 has a cylinder head to which spark plugs 22 are attached for the respective cylinders so that the air-fuel mixture in each cylinder can be ignited by the spark discharge of the spark plug 22 of each cylinder.

The exhaust pipe 23 of the engine 11 is provided with an emission gas sensor 24 (e.g., an air-fuel ratio sensor or an oxygen sensor) to detect the air-fuel ratio, richness/leanness, or the like of the emission gas. The exhaust pipe 23 is also provided with a catalyst 25, such as a three-way catalyst, disposed downstream of the emission gas sensor 24 to purify the emission gas.

Further, the engine 11 has a cylinder block to which a cooling water temperature sensor 26 (cooling water temperature sensing means (unit)) and a knock sensor 29 are attached. The cooling water temperature sensor 26 senses the temperature of the cooling water. The knock sensor 29 senses knocking. A crank angle sensor 28 is attached to an outer peripheral side of a crank shaft 27. The crank angle sensor 28 outputs a pulse signal every time the crank shaft 27 rotates by a predetermined crank angle. A crank angle and an engine speed are detected based on the output signal of the crank angle sensor 28.

The engine 11 can use, as a fuel, a variety of fuels having different properties, for example, gasoline, alcohol such as ethanol and methanol, and an alcohol blended fuel that is a blend of gasoline and alcohol. The driver can select any of gasoline, alcohol, and alcohol blended fuel for supply into a fuel tank 30. The fuel tank 30 is provided with a fuel pump 31 therein to pump the fuel. The fuel discharged from the fuel pump 31 is transferred to a delivery pipe 33 through a fuel line 32. Then, the fuel is distributed from the delivery pipe 33 to the fuel injection valves 21 for the respective cylinders. A portion of the fuel line 32, which portion is near the fuel pump 31, is connected with a fuel filter 34 and a pressure regulator 35. The pressure regulator 35 regulates the discharge pressure of the fuel pump 31 so as to be a predetermined pressure. The extra fuel corresponding to the excess of the pressure is adapted to be returned into the fuel tank 30 by a fuel return pipe 36.

A fuel property sensor 37, such as an alcohol concentration sensor, is attached to a predetermined position of the fuel path (the fuel line 32 and the delivery pipe 33) extending from the fuel tank 30 to the fuel injection valves 21. The fuel property sensor 37 detects a fuel property, such as alcohol concentration of the fuel. The position at which the fuel property sensor 37 is attached is not limited to the fuel path, but may be provided in the fuel tank 30. Also, the fuel property sensor 37 may have any configuration. For example, the fuel property sensor 37 may be a capacitance alcohol concentration sensor that measures capacitance according to the dielectric constant of the fuel to sense the alcohol concentration, or may be an optical (translucent) alcohol concentration sensor that measures the amount of light transmitted through the fuel (transmittance) to sense the alcohol concentration.

The fuel tank 30 is connected with a canister 42 via an evaporation line 41. The canister 42 accommodates therein an adsorber (not shown), such as activated carbon, which adsorbs evaporating gas (fuel evaporative emission). The evaporating gas adsorbed by the adsorber in the canister 42 is purged (discharged) to the engine intake system (e.g., part of the intake pipe 12 downstream of the throttle valve 16, or the surge tank 18, or the intake manifold 20) via a purge path 43. The purge path 43 is located between the canister 42 and the engine intake system. A purge control valve 44 is disposed midway in the purge path 43. The purge control valve 44 regulates purge flow according to the engine operating conditions.

Further, the fuel tank 30 is provided with a fuel level sensor 45 that senses a fuel level (residual fuel quantity) in the fuel tank 30. The outputs of the fuel level sensor 45 and the various sensors described above are inputted to a control circuit (hereinafter referred to as an "ECU" (electronic control unit)) 47. The ECU 47 is principally configured with a microcomputer incorporating a ROM (storage medium). The ECU 47 controls the fuel injection quantity of each fuel injection valve 21 and the ignition timing of each spark plug 22 according to the engine operating conditions, by executing various engine control programs stored in the ROM.

In performing the above control, a relationship is taken into account, the relationship being that, as the alcohol concentration of the fuel becomes higher, the theoretical air-fuel ratio of the fuel becomes smaller, thereby increasing the fuel injection quantity required for controlling the actual air-fuel ratio to the theoretical air-fuel ratio. Taking this relationship into account, the ECU 47 executes a fuel injection control program (not shown) to determine a fuel property correction amount FAFs for the fuel injection quantity, according to the alcohol concentration of the fuel, such that the fuel injection quantity will be increased as the alcohol concentration of the fuel, which is sensed by the fuel property sensor 37, becomes higher. At the same time, the ECU 47 effects air-fuel ratio feedback control to determine an air-fuel ratio feedback correction amount FAF, according to the difference (air-fuel ratio deviation) between a detection value (actual air-fuel ratio) derived from the emission gas sensor 24 and the target air-fuel ratio. In this way, the fuel injection quantity is adapted to be corrected using the fuel property correction amount FAFs and the air-fuel ratio feedback correction amount FAF. It may be so configured that the target air-fuel ratio is changed/corrected according to the alcohol concentration of the fuel. In this case, the fuel property correction amount FAFs is not necessary because the air-fuel ratio feedback correction amount FAF (air-fuel ratio correction amount) includes a correction amount corresponding to the fuel property correction amount FAFs.

In this way, the ECU 47 functions as an air-fuel ratio control means (unit) that determines the air-fuel ratio correction amount (the fuel property correction amount FAFs and the air-fuel ratio feedback correction amount FAF) according to the difference between the target air-fuel ratio and the actual air-fuel ratio (air-fuel ratio deviation) and according to the fuel property, such as alcohol concentration, sensed by the fuel property sensor 37 to correct the fuel injection quantity using the air-fuel ratio correction amount. At the same time, the ECU 47 also functions as a refueling determining means (unit) that determines whether fuel has been supplied to the fuel tank 30.

In this case, refueling determining methods may include: a method in which it is determined whether or not the fuel level (residual fuel quantity) sensed in the fuel tank 30 by the fuel level sensor 45 at the time of engine start (at the time of turning on the ignition switch) has become higher than the fuel level sensed at the time of previous engine stop (at the time of turning off the ignition switch) to determine whether refueling has been performed; a method in which the opening/closing of a fuel cap that closes a fuel filler port of the fuel tank 30 is monitored by a fuel cap opening/closing switch (not shown) that detects opening/closing of the fuel cap to determine whether refueling has been performed; and a method in which a detection value of a fuel temperature sensor (not shown) that senses the temperature of a fuel in the fuel tank 30 is monitored while the vehicle is stopped and, when the temperature of the fuel in the fuel tank 30 has sharply lowered, it is determined that refueling has been performed.

Figure 2:
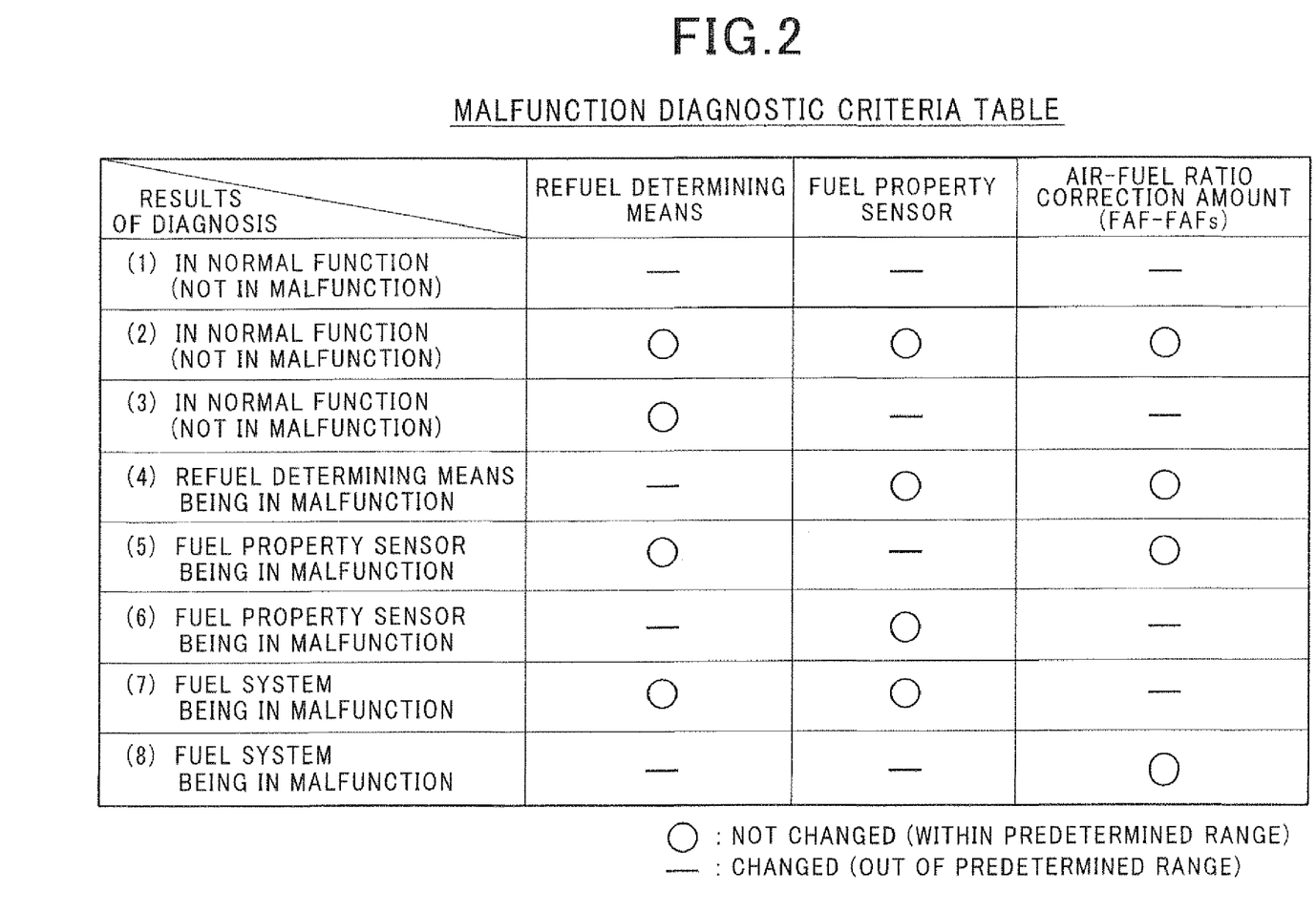
FIG. 2 illustrates a malfunction diagnostic criteria table.
Figure 3:
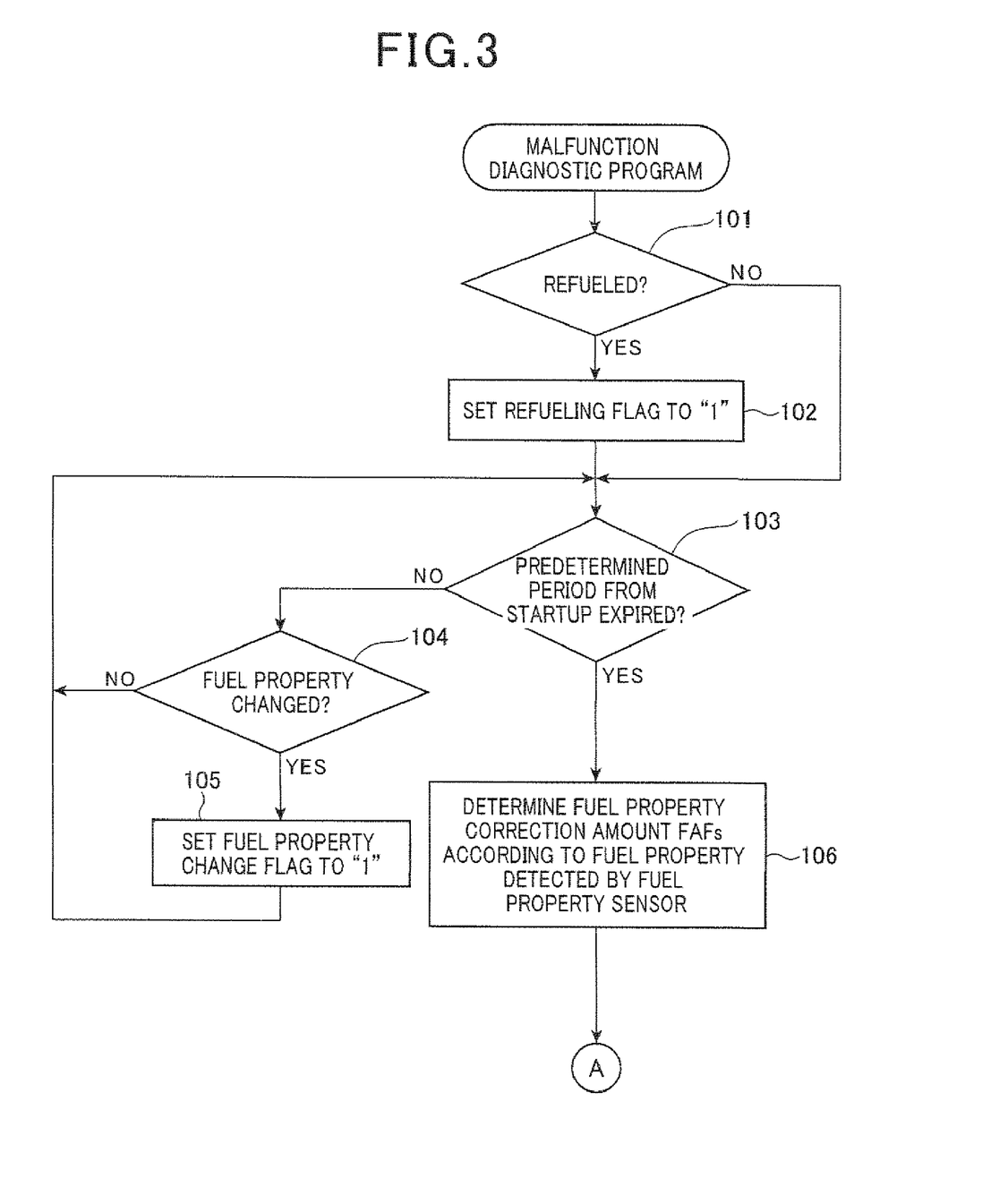
FIG. 3 is a flow diagram 1 illustrating a process flow of a malfunction diagnostic program.
Figure 4:
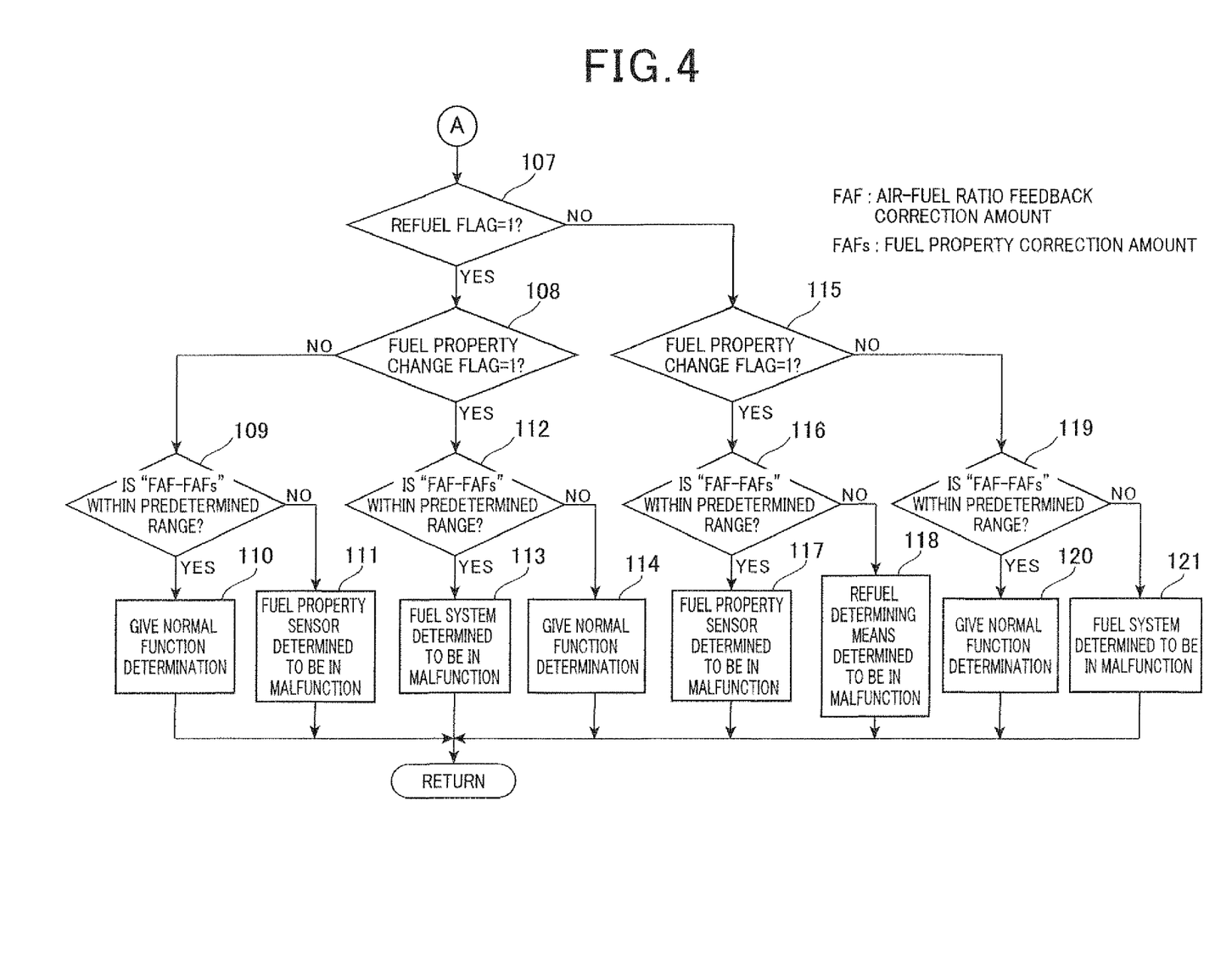
FIG. 4 is a flow diagram 2 illustrating a process flow of a malfunction diagnostic program.

The ECU 47 executes a malfunction diagnostic program shown in FIGS. 3 and 4. The ECU 47 uses combinations of the determination result of the refueling determining means, the detection result of the fuel property sensor 37, and the air-fuel ratio correction amount (in the present embodiment, the deviation between the air-fuel ratio feedback correction amount FAF and the fuel property correction amount FAFs: "FAF-FAFs"). Based on the combinations, the ECU 47 definitively diagnoses malfunctions of the refueling determining means, the fuel property sensor 37, and the fuel system (fuel injection valves 21, pressure regulator 35, fuel pump 31, etc.) extending from the fuel tank 30 to the fuel injection valves 21. Specifically, the malfunction diagnoses are conducted as described below, according to a malfunction diagnostic criteria table shown in FIG. 2.

(A) In the case where the determination made by the refueling determining means results in "not refuelled" and the detection conducted by the fuel property sensor 37 results in "fuel property changed", when the air-fuel ratio correction amount exceeds a predetermined range, it is determined that the refueling determining means is malfunctioning ((4) in FIG. 2), and when the air-fuel ratio correction amount falls within the predetermined range, it is determined that the fuel property sensor 37 is malfunctioning ((6) in FIG. 2). Here, the predetermined range may be the variation range of the air-fuel ratio correction amount at the time of "fuel property (e.g., alcohol concentration) not changed".

When both of the refueling determining means and the fuel property sensor 37 are functioning normally (in normal function), in the case where the determination made by the refueling determining means results in "not refuelled", the detection of the fuel property sensor 37 will result in "fuel property not changed". Accordingly, in the case where the determination made by the refueling determining means results in "not refuelled" and the detection of the fuel property sensor 37 results in "fuel property changed", this means that either the refueling determining means or the fuel property sensor 37 is malfunctioning (in malfunction).

In this case, when the air-fuel ratio correction amount exceeds the predetermined range (the variation range of the air-fuel ratio correction amount at the time of "fuel property not changed"), this means that the fuel property has actually changed. Therefore, it may be determined that the determination result "not refuelled" derived from the refueling determining means is in error and that, accordingly, the refueling determining means may be determined to be malfunctioning. On the other hand, when the air-fuel ratio correction amount falls within the predetermined range, this means that the fuel property has not changed. Therefore, it may be determined that the detection result "fuel property changed" derived from the fuel property sensor 37 is in error and that, accordingly, the fuel property sensor 37 may be determined to be malfunctioning.

(B) In the case where the determination made by the refueling determining means results in "not refuelled" and the detection conducted by the fuel property sensor 37 results in "fuel property not changed", when the air-fuel ratio correction amount exceeds the predetermined range, it is determined that the fuel system is malfunctioning ((8) in FIG. 2), and when the air-fuel ratio correction amount falls within the predetermined range, it is determined that the refueling determining means, the fuel property sensor 37 and the fuel system are all functioning normally (not in malfunction) ((1) in FIG. 2).

As will be understood from the above relationship, in the case where the determination made by the refueling determining means results in "not refuelled" and the detection conducted by the fuel property sensor 37 results in "fuel property not changed", it is determined that refueling has not been performed (the fuel property has not changed). However, when the air-fuel ratio correction amount exceeds the predetermined range, this means that the fuel injection quantity exceeds the variation range at the time of "fuel property not changed". In this case, it may be determined that the fuel system is malfunctioning. On the other hand, when the air-fuel ratio correction amount falls within the predetermined range, this means that the fuel injection quantity falls within the variation range at the time of "fuel property not changed". In this case, it is determined that the refueling determining means, the fuel property sensor 37 and the fuel system are all functioning normally (not in malfunction).

(C) In the case where the determination made by the refueling determining means results in "refuelled" and the detection conducted by the fuel property sensor 37 results in "fuel property changed", when the air-fuel ratio correction amount falls with the predetermined range, it is determined that the fuel system is malfunctioning ((7) in FIG. 2), and when the air-fuel ratio correction amount exceeds the predetermined range, it is determined that the refueling determining means, the fuel property sensor 37 and the fuel system are all functioning normally (not in malfunction) ((2) in FIG. 2).

As will be understood from the above relationship, in the case where the determination made by the refueling determining means results in "refuelled" and the detection conducted by the fuel property sensor 37 results in "fuel property changed", it is determined that a fuel having a property different from that of the residual fuel in the fuel tank 30 has been supplied. However, when the air-fuel ratio correction amount falls within the predetermined range, this means that the fuel injection quantity has barely varied regardless of the actual change of the fuel property. In this case, it may be determined that the fuel system is malfunctioning. On the other hand, when the air-fuel ratio correction amount exceeds the predetermined range, it is determined that the refueling determining means, the fuel property sensor 37 and the fuel system are all functioning normally (not in malfunction).

(D) In the case where the determination made by the refueling determining means results in "refuelled" and the detection conducted by the fuel property sensor 37 results in "fuel property not changed", when the air-fuel ratio correction amount exceeds the predetermined range, it is determined that the fuel property sensor 37 is malfunctioning ((5) in FIG. 2), and when the air-fuel ratio correction amount falls within the predetermined range, it is determined that the refueling determining means, the fuel property sensor 37 and the fuel system are all functioning normally (not in malfunction) ((3) in FIG. 2).

In the case where the determination made by the refueling determining means results in "refuelled" and the detection conducted by the fuel property sensor 37 results in "fuel property not changed", it is determined that a fuel having the same property as that of the residual fuel in the fuel tank 30 has been supplied. However, when the air-fuel ratio correction amount exceeds the predetermined range (the variation range of the air-fuel ratio correction amount at the time of "fuel property not changed"), this means that the fuel property has actually changed. In this case, it may be determined that the fuel property sensor 37 is malfunctioning. On the other hand, when the air-fuel ratio correction amount falls within the predetermined range, it is determined that the refueling determining means, the fuel property sensor 37 and the fuel system are all functioning normally (not in malfunction).

Let us discuss a case where a fuel having a property different from that of the residual fuel in the fuel tank 30 has been supplied. In this case, the fuel before refueling, i.e. the fuel remaining in the fuel path (the fuel line 32 and the delivery pipe 33) extending from the fuel tank 30 to the fuel injection valves 21, is injected from the injection valves 21 immediately after starting the engine. Therefore, after start of the engine, the fuel after refueling will not be injected from the fuel injection valves 21 until the fuel before refueling that has remained in the fuel path is all consumed (injected).

Taking this into account, the malfunction diagnosis in the present embodiment is configured to be executed after expiration of a predetermined period from the start of the engine, which period is required for consuming all of the fuel that has remained in the fuel path extending from the fuel tank 30 to the fuel injection valves 21. According to this configuration, the malfunction diagnosis can be prevented from being executed during the period after the start of the engine, in which period the fuel before refueling that has remained in the fuel path is being injected from the fuel injection valves 21. Thus, the occurrence of error in malfunction diagnosis can be prevented, thereby enhancing reliability in malfunction diagnosis.

As described above, the malfunction diagnosis according to the present embodiment is executed by the ECU 47 according to the malfunction diagnostic program shown in FIGS. 3 and 4. The malfunction diagnostic program shown in FIGS. 3 and 4 is repeatedly performed at a predetermined cycle during the period when the power source of the ECU 47 is being turned on, so that the ECU 47 can act as a malfunction diagnosing means (unit).

Upon start of the present program, it is determined, first, in step 101, whether or not the determination made by the refueling determining means has resulted in "refuelled", using a refueling determining method described above. When it is determined to be "refuelled", control proceeds to step 102 where a refuel flag is set to "1" which means "refuelled", and control then proceeds to step 103. In step 101 mentioned above, when "not refuelled" determination is made, "refuel flag=0" is maintained, and in this state, control proceeds to step 103.

In step 103, it is determined whether or not a predetermined time has expired from the start of the engine. The predetermined time is set to the time after the start of the engine, which time is required for consuming all the fuel that has remained in the fuel path extending from the fuel tank 30 to the fuel injection valves 21 (the time required before the fuel after refueling is injected from the fuel injection valves 21). When it is determined, in step 103, that the predetermined time has not yet expired from the start of the engine, control proceeds to step 104. In step 104, it is determined whether or not the detection conducted by the fuel property sensor 37 has resulted in "fuel property changed". When the detection result is determined to be "fuel property changed", then control proceeds to step 105. In step 105, a fuel property change flag is set to "1" meaning "fuel property changed", and then control returns to step 103. In step 103, control stands by up until the predetermined time expires from the start of the engine.

It should be noted that, in step 104, immediately after the determination "fuel property changed" is made, the fuel property correction amount FAFs may be changed according to the fuel property detected by the fuel property sensor 37. Alternatively, consideration may be given to the fact that the fuel before refueling remains in the fuel path extending from the fuel property sensor 37 to the fuel injection valves 21. Taking this into consideration, upon expiration of the predetermined time required for consuming the fuel before refueling that has remained in the fuel path, the fuel property correction amount FAFs may be changed according to the fuel property detected by the fuel property sensor 37.

On the other hand, in step 104, when the detection result is determined to be "fuel property not changed", a process of determining whether or not the detection conducted by the fuel property sensor 37 results in "fuel property changed" is repeated up until the predetermined time from the start of the engine expires.

Then, after expiration of the predetermined time from the start of the engine, control proceeds to step 106. In step 106, the fuel property correction amount FAFs for the fuel injection quantity is determined according to the fuel property detected by the fuel property sensor 37.

Then, control proceeds to step 107 shown in FIG. 4 where it is determined whether or not "refuel flag=1" ("refuelled") is established. Then, in the subsequent step 108 or 115, it is determined whether or not "fuel property change flag=1" ("fuel property changed") is established. Malfunction diagnosis is conducted based on the combinations of these determination results as described below.

When it is determined that relations "refuel flag=1" ("refuelled") and "fuel property change flag=0" ("fuel property not changed") are established in steps 107 and 108, respectively, control proceeds to step 109. In step 109, it is determined whether or not the deviation between the air-fuel ratio feedback correction amount FAF and the fuel property correction amount FAFs (FAF-FAFs) falls within a predetermined range. When the deviation (FAF-FAFs) falls within the predetermined range, control proceeds to step 110 where the engine control system is determined to be functioning normally (not in malfunction) ((3) in FIG. 2). On the other hand, when the deviation (FAF-FAFs) exceeds the predetermined range, control proceeds to step 111 where the fuel property sensor 37 is determined to be malfunctioning ((5) in FIG. 2).

When it is determined that relations "refuel flag=1" ("refuelled") and "fuel property change flag=1" ("fuel property changed") are established in steps 107 and 108, respectively, control proceeds to step 112. In step 112, it is determined whether or not the deviation between the air-fuel ratio feedback correction amount FAF and the fuel property correction amount FAFs (FAF-FAFs) falls within a predetermined range. When the deviation (FAF-FAFs) falls within the predetermined range, control proceeds to step 113 where it is determined that the fuel system is malfunctioning ((7) in FIG. 2). On the other hand, when the deviation (FAF-FAFs) exceeds the predetermined range, control proceeds to step 114 where the engine control system is determined to be functioning normally (not in malfunction) ((2) in FIG. 2).

When it is determined that relations "refuel flag=0" ("not refuelled") and "fuel property change flag=1" ("fuel property changed") are established in steps 107 and 115, respectively, control proceeds to step 116. In step 116, it is determined whether or not the deviation between the air-fuel ratio feedback correction amount FAF and the fuel property correction amount FAFs (FAF-FAFs) falls within a predetermined range. When the deviation (FAF-FAFs) falls within the predetermined range, control proceeds to step 117 where it is determined that the fuel property sensor 37 is malfunctioning ((6) in FIG. 2). When the deviation (FAF-FAFs) exceeds the predetermined range, control proceeds to step 118 where it is determined that the refueling determining means is malfunctioning ((4) in FIG. 2).

When it is determined that relations "refuel flag=0" ("not refuelled") and "fuel property change flag=0" ("fuel property not changed") are established in steps 107 and 115, respectively, control proceeds to step 119. In step 119, it is determined whether or not the deviation between the air-fuel ratio feedback correction amount FAF and the fuel property correction amount FAFs (FAF-FAFs) falls within a predetermined range. When the deviation (FAF-FAFs) falls within the predetermined range, control proceeds to step 120 where the engine control system is determined to be functioning normally (not in malfunction) ((1) in FIG. 2). On the other hand, when the deviation (FAF-FAFs) exceeds the predetermined range, control proceeds to step 121 where it is determined that the fuel system is malfunctioning ((8) in FIG. 2).

According to the present embodiment described, malfunction of the refueling determining means, malfunction of the fuel property sensor 37 and malfunction of the fuel system are configured to be definitively diagnosed based on the combinations of the results of determination made by the refueling determining means, the results of detection conducted by the fuel property sensor 37 and the air-fuel ratio correction amount (FAF-FAFs). In this way, in the case where malfunction diagnosis of the refueling determining means, malfunction diagnosis of the fuel property sensor 37, and malfunction diagnosis of the fuel system are conducted in combination, malfunctions of these components of the engine control system can be definitively diagnosed.

It should be noted that the target air-fuel ratio may be changed/corrected according to the fuel property (alcohol concentration) detected by the fuel property sensor 37. In this case, the difference between the target air-fuel ratio and the actual air-fuel ratio (air-fuel ratio deviation), or the air-fuel ratio feedback correction amount FAF may be used instead of the deviation between the air-fuel ratio feedback correction amount FAF and the fuel property correction amount FAFs.

Hereinafter, aspects of the above-described embodiments will be summarized.

The above embodiments provide, as one aspect, a malfunction diagnosing apparatus for an internal combustion engine which enables selection of a fuel to be supplied to a fuel tank from a plurality of fuels having different properties, including: a refueling determining unit that determines whether fuel has been supplied to the fuel tank; a fuel property sensor that detects a property of the fuel supplied from the fuel tank to a fuel injection valve; an air-fuel ratio control unit that determines an air-fuel ratio correction amount according to a difference between a target air-fuel ratio and an actual air-fuel ratio and according to the property of the fuel sensed by the fuel property sensor to correct a fuel injection quantity of the fuel injection valve using the air-fuel ratio correction amount; and a malfunction diagnosing unit that definitively diagnoses malfunction of the refueling determining unit, malfunction of the fuel property sensor, and malfunction of a fuel system extending from the fuel tank to the fuel injection valve, based on a combination of a result of a determination made by the refueling determining unit, a result of detection conducted by the fuel property sensor, and the air-fuel ratio correction amount or the difference.

The property detected by the fuel property sensor is the fuel property which will have an effect on the air-fuel ratio feedback control. For example, the fuel property sensor may detect, as such a fuel property, any of the alcohol concentration, density (degree of heaviness/lightness), octane number, and the like of the fuel. According to this configuration, in the case where malfunction diagnosis of the refueling determining unit, malfunction diagnosis of the fuel property sensor, and malfunction diagnosis of the fuel system are conducted in combination, malfunctions of these components of the engine control system can be definitively diagnosed.

Specifically, in the case where the refueling determining unit determines that the fuel has not been supplied, and the fuel property sensor detects a change of the property of the fuel, when the air-fuel ratio correction amount or the difference exceeds a predetermined range, the malfunction diagnosing unit determines that the refueling determining unit is malfunctioning, and when the air-fuel ratio correction amount or the difference falls within the predetermined range, the malfunction diagnosing unit determines that the fuel property sensor is malfunctioning. The predetermined range may be set to the variation range of the air-fuel ratio correction amount or the air-fuel ratio deviation at the time of "fuel property not changed".

In the case where both of the refueling determining unit and the fuel property sensor are in normal function, when the determination made by the refueling determining unit results in "not refuelled", the detection conducted by the fuel property sensor will result in "fuel property not changed". Accordingly, when the determination made by the refueling determining unit results in "not refuelled" and the detection conducted by the fuel property sensor results in "fuel property changed", this means that either of the refueling determining unit and the fuel property sensor is malfunctioning.

In this case, when the air-fuel ratio correction amount or the air-fuel ratio deviation exceeds the predetermined range (the variation range of the air-fuel ratio correction amount or the air-fuel ratio deviation at the time of "fuel property not changed"), this means that the fuel property has actually changed. Therefore, it may be determined that the determination result "not refuelled" derived from the refueling determining unit is in error, and that, accordingly, the refueling determining unit may be determined to be malfunctioning.

On the other hand, when the air-fuel ratio correction amount or the air-fuel ratio deviation falls within the predetermined range, this means that the fuel property has not changed. Therefore, it may be determined that the determination result "fuel property changed" derived from the fuel property sensor is in error, and that, accordingly, the fuel property sensor may be determined to be malfunctioning.

In the case where the refueling determining unit determines that the fuel has not been supplied, and the fuel property sensor does not detect a change of the property of the fuel, when the air-fuel ratio correction amount or the difference exceeds a predetermined range, the malfunction diagnosing unit determines that the fuel system is malfunctioning. As will be understood from the relationship mentioned above, when the determination made by the refueling determining unit results in "not refuelled" and the detection conducted by the fuel property sensor results in "fuel property not changed", it is determined that fueling has not been performed (the fuel property has not changed). However, when either the air-fuel ratio correction amount or the air-fuel ratio deviation exceeds the predetermined range, this means that the fuel injection quantity exceeds the variation range at the time of "fuel property not changed". Therefore, it may be determined in this case that the fuel system is malfunctioning.

In the case where the refueling determining unit determines that the fuel has been supplied, and the fuel property sensor detects a change of the property of the fuel, when the air-fuel ratio correction amount or the difference falls within a predetermined range, the malfunction diagnosing unit determines that the fuel system is malfunctioning. As will be understood from the relationship mentioned above, when the determination made by the refueling determining unit results in "refuelled" and the detection conducted by the fuel property sensor results in "fuel property changed", it is determined that a fuel having a property different from that of the residual fuel in the fuel tank has been supplied. In this case, when either the air-fuel ratio correction amount or the air-fuel ratio deviation falls within the predetermined range, this means that the fuel injection quantity has barely changed regardless of the actual change in the fuel property. Therefore, it may be determined that the fuel system is malfunctioning.

In the case where the refueling determining unit determines that the fuel has been supplied, and the fuel property sensor does not detect a change of the property of the fuel, when the air-fuel ratio correction amount or the difference exceeds a predetermined range, the malfunction diagnosing unit determines that the fuel property sensor is malfunctioning. When the determination made by the refueling determining unit results in "refuelled" and the detection conducted by the fuel property sensor results in "fuel property not changed", it is determined that a fuel having a property which is the same as that of the residual fuel in the fuel tank has been refuelled. In this case, when either the air-fuel ratio correction amount or the air-fuel ratio deviation exceeds the predetermined range (the variation range of the air-fuel ratio correction amount or the air-fuel ratio deviation at the time of "fuel property not changed"), this means that the fuel property has actually changed. Therefore, it may be determined that the fuel property sensor is malfunctioning.

When a fuel having a property different from that of the residual fuel in the fuel tank has been refuelled, the fuel before refueling that has remained in the fuel path extending from the fuel tank to the fuel injection valves is injected from the fuel injection valves immediately after the start of the engine. Thus, after the start of the engine, the fuel after refueling will not be injected from the fuel injection valves until the fuel before refueling is all consumed (injected).

Considering the above, the malfunction diagnosing unit diagnoses the malfunction after expiration of a predetermined period from the start of the engine, which period is required for consuming all of the fuel that has remained in a fuel path extending from the fuel tank to the fuel injection valve. According to this configuration, malfunction diagnosis can be prevented from being executed during the period after the start of the engine, when the fuel before refueling that has remained in the fuel path is being injected from the fuel injection valves. In this way, the occurrence of error in the malfunction diagnosis can be prevented, thereby enhancing the reliability of malfunction diagnosis.

It will be appreciated that the present invention is not limited to the configurations described above, but any and all modifications, variations or equivalents, which may occur to those who are skilled in the art, should be considered to fall within the scope of the present invention.

What is claimed is:

1. A malfunction diagnosing apparatus for an internal combustion engine which enables selection of a fuel to be supplied to a fuel tank from a plurality of fuels having different properties, comprising:
    a refueling determining unit that determines whether fuel has been supplied to the fuel tank;
    a fuel property sensor that detects a property of the fuel supplied from the fuel tank to a fuel injection valve;
    an air-fuel ratio control unit that determines an air-fuel ratio correction amount according to a difference between a target air-fuel ratio and an actual air-fuel ratio and according to the property of the fuel sensed by the fuel property sensor to correct a fuel injection quantity of the fuel injection valve using the air-fuel ratio correction amount; and
    a malfunction diagnosing unit that definitively diagnoses malfunction of the refueling determining unit, malfunction of the fuel property sensor, and malfunction of a fuel system extending from the fuel tank to the fuel injection valve, based on a combination of a result of a determination made by the refueling determining unit, a result of detection conducted by the fuel property sensor, and the air-fuel ratio correction amount or the difference.

2. The apparatus according to claim 1, wherein
in a case where the refueling determining unit determines that the fuel has not been supplied, and the fuel property sensor detects a change of the property of the fuel, when the air-fuel ratio correction amount or the difference exceeds a predetermined range, the malfunction diagnosing unit determines that the refueling determining unit is malfunctioning, and when the air-fuel ratio correction amount or the difference falls within the predetermined range, the malfunction diagnosing unit determines that the fuel property sensor is malfunctioning.

3. The apparatus according to claim 1, wherein
in a case where the refueling determining unit determines that the fuel has not been supplied, and the fuel property sensor does not detect a change of the property of the fuel, when the air-fuel ratio correction amount or the difference exceeds a predetermined range, the malfunction diagnosing unit determines that the fuel system is malfunctioning.

4. The apparatus according to claim 1, wherein
in a case where the refueling determining unit determines that the fuel has been supplied, and the fuel property sensor detects a change of the property of the fuel, when the air-fuel ratio correction amount or the difference falls within a predetermined range, the malfunction diagnosing unit determines that the fuel system is malfunctioning.

5. The apparatus according to claim 1, wherein
in a case where the refueling determining unit determines that the fuel has been supplied, and the fuel property sensor does not detect a change of the property of the fuel, when the air-fuel ratio correction amount or the difference exceeds a predetermined range, the malfunction diagnosing unit determines that the fuel property sensor is malfunctioning.

6. The apparatus according to claim 1, wherein
the malfunction diagnosing unit diagnoses the malfunction after expiration of a predetermined period from the start of the engine, the predetermined period being required for consuming all of the fuel that has remained in a fuel path extending from the fuel tank to the fuel injection valve.

\* \* \* \* \*